United States Patent
Kim et al.

(10) Patent No.: US 10,124,299 B2
(45) Date of Patent: Nov. 13, 2018

(54) MEMBRANE BASED ON GRAPHENE AND METHOD OF MANUFACTURING SAME

(71) Applicant: GWANGJU INSTITUTE OF SCIENCE AND TECHNOLOGY, Gwangju (KR)

(72) Inventors: In Soo Kim, Gwangju (KR); Euntae Yang, Gwangju (KR); Junho Song, Gwangju (KR); Chang-Min Kim, Gwangju (KR)

(73) Assignee: GWANGJU INSTITUTE OF SCIENCE AND TECHNOLOGY, Gwangju (KR)

( * ) Notice: Subject to any disclaimer, the term of this patent is extended or adjusted under 35 U.S.C. 154(b) by 93 days.

(21) Appl. No.: 15/259,531

(22) Filed: Sep. 8, 2016

(65) Prior Publication Data
US 2017/0065939 A1    Mar. 9, 2017

(30) Foreign Application Priority Data

Sep. 8, 2015 (KR) .................. 10-2015-0126725
Sep. 8, 2016 (KR) .................. 10-2016-0115699

(51) Int. Cl.
| | | |
|---|---|---|
| *B01D 39/00* | (2006.01) | |
| *B01D 67/00* | (2006.01) | |
| *B01D 69/12* | (2006.01) | |
| *B01D 63/00* | (2006.01) | |
| *B01D 71/02* | (2006.01) | |
| *B01D 61/02* | (2006.01) | |
| *C02F 1/44* | (2006.01) | |
| *C02F 103/08* | (2006.01) | |

(52) U.S. Cl.
CPC ......... *B01D 71/021* (2013.01); *B01D 61/027* (2013.01); *B01D 67/0072* (2013.01); *B01D 67/0081* (2013.01); *B01D 69/12* (2013.01); *B01D 71/022* (2013.01); *B01D 71/024* (2013.01); *C02F 1/442* (2013.01); *B01D 2325/02* (2013.01); *C02F 2103/08* (2013.01)

(58) Field of Classification Search
CPC ...... B01D 69/12; B01D 71/02; B01D 71/024; B01D 61/027; B01D 67/0069; B82Y 30/00; B82Y 40/00; Y10S 977/734; Y10S 55/05; Y10S 977/78
See application file for complete search history.

(56) References Cited

U.S. PATENT DOCUMENTS

| | | | |
|---|---|---|---|
| 9,610,546 B2 * | 4/2017 | Sinton ................. | B01D 71/028 |
| 9,870,895 B2 * | 1/2018 | Bedworth ............. | H01J 37/31 |
| 2012/0171376 A1 * | 7/2012 | Dodge .................... | C08J 9/365 |
| | | | 427/255.24 |
| 2013/0192460 A1 * | 8/2013 | Miller .................... | B01D 53/22 |
| | | | 95/47 |
| 2013/0270188 A1 * | 10/2013 | Karnik ................. | B01D 53/228 |
| | | | 210/650 |

(Continued)

*Primary Examiner* — Ana M Fortuna
(74) *Attorney, Agent, or Firm* — Hauptman Ham, LLP

(57) ABSTRACT

Disclosed herein are a graphene-based membrane and a method of manufacturing the same. The graphene-based membrane includes: monolayer graphene containing defects; a deposition layer disposed on the defects; and nanopores surrounded by the deposition layer. The method of manufacturing a graphene-based membrane includes forming a monolayer graphene sheet and partially forming a deposition layer on the graphene sheet.

7 Claims, 2 Drawing Sheets

(56) References Cited

U.S. PATENT DOCUMENTS

| | | | |
|---|---|---|---|
| 2013/0309776 A1* | 11/2013 | Drndic | G01N 27/26 |
| | | | 436/94 |
| 2014/0154464 A1* | 6/2014 | Miller | B01D 39/2055 |
| | | | 428/137 |
| 2015/0122727 A1* | 5/2015 | Karnik | B01D 53/22 |
| | | | 210/500.21 |
| 2016/0339160 A1* | 11/2016 | Bedworth | A61M 1/1623 |
| 2017/0296976 A1* | 10/2017 | Liu | B01D 65/108 |

\* cited by examiner

MEMBRANE BASED ON GRAPHENE AND METHOD OF MANUFACTURING SAME

CROSS REFERENCE TO RELATED APPLICATION

This application claims the benefit of Korean Patent Application Nos. 10-2015-0126725, filed on Sep. 8, 2015, and 10-2016-0115699, filed on Sep. 8, 2016, entitled "GRAPHENE-BASED MEMBRANE AND METHOD OF MANUFACTURING THE SAME", which is hereby incorporated by reference in their entireties into this application.

BACKGROUND

1. Technical Field

The present invention relates to a graphene-based porous membrane can be used as a reverse osmosis membrane, a forward osmosis membrane, a microfiltration membrane, an ultrafiltration membrane and a nanofiltration membrane by controlling pore size, and a method of manufacturing the same.

2. Description of the Related Art

Water shortage becomes a severe problem all over the world due to global warming, climate change, environmental pollution, and the like. Since the vast majority of water on the earth is seawater, seawater desalination technology is becoming increasingly important as a means for solving water shortage problems.

Seawater desalination methods are mainly classified into an evaporation method and a reverse osmosis method. Since the evaporation method requires higher energy consumption than other desalination methods, the reverse osmosis method is most widely employed.

The reverse osmosis method is a process of desalinating seawater by applying pressure to a semipermeable membrane and has a problem of increase in energy consumption resulting therefrom. Thus, the reverse osmosis method is more costly than typical methods for producing drinking water.

Since reverse osmosis-related techniques have already considerably been optimized, it is difficult to significantly reduce energy consumption.

Therefore, there is a need for a high-performance reverse osmosis membrane capable of replacing typical polymeric reverse osmosis membranes.

In addition, there is a need for a membrane which is formed of a physically, chemically stable material so as to reduce process costs and improve process efficiency.

Further, there is a need for a membrane fabrication method which can fabricate membranes having various pore sizes depending on materials to be removed.

BRIEF SUMMARY

The present invention relates to a graphene-based porous membrane and a method of manufacturing the same. It is an aspect of the present invention to provide a graphene-based membrane which is manufactured using graphene, which has a single-atom thickness, is very flexible, and has high physical strength, and thus can be used semi-permanently or permanently.

It is another aspect of the present invention to provide a graphene-based membrane which includes monolayer large-area graphene, thereby increasing the number of pores and reducing thickness. Thus, it is possible to desalinate a large amount of saltwater while reducing energy consumption.

It is a further aspect of the present invention to provide a graphene-based membrane which is manufactured using graphene containing defects. Specifically, it is possible to overcome technical difficulty in fabricating defect-free monolayer large-area graphene and technical difficulty in forming nanoscale pores in such monolayer graphene. Thus, it is possible to reduce process costs while improving process efficiency.

In accordance with one aspect of the present invention, there is provided a graphene-based membrane including: monolayer graphene containing defects; a deposition layer disposed on the defects; and nanopores surrounded by the deposition layer.

In accordance with another aspect of the present invention, there is provided a method of manufacturing a graphene-based membrane, including: forming a single layer graphene sheet; and partially forming a deposition layer on the graphene sheet.

According to the present invention, it is possible to provide a graphene-based porous membrane which is manufactured using physically and chemically stable graphene, and thus can be used semi-permanently or permanently and be highly economical.

In addition, according to the present invention, it is possible to provide a graphene-based porous membrane which includes at least one of a metal oxide and a metal deposited on defects of graphene, whereby nanoscale pores can be formed through control and utilization of the defects. Here, the nanoscale pores may be sized to be impermeable to salt and permeable to water. Thus, it is possible to effectively remove salt from saltwater.

Further, according to the present invention, it is possible to provide a graphene-based porous membrane which is manufactured using graphene containing defects and can adjust pore size through adjustment of the size of defects without employing a separate pore-forming technique. Thus, it is possible to fabricate various water treatment membranes. For example, through adjustment of pore size, it is possible to fabricate a graphene-based membrane which can be used as a reverse osmosis membrane, a forward osmosis membrane, a microfiltration membrane, an ultrafiltration membrane, and a nanofiltration membrane.

Moreover, according to the present invention, it is possible to provide a graphene-based porous membrane which has high water flux and salt rejection.

BRIEF DESCRIPTION OF THE DRAWINGS

The above and other aspects, features, and advantages of the present invention will become apparent from the detailed description of the following embodiments in conjunction with the accompanying drawings, in which.

DETAILED DESCRIPTION

Hereinafter, exemplary embodiments of the present invention will be described in detail with reference to the accompanying drawings. However, it should be understood that the present invention is not limited to the following embodiments.

Typical polymeric membranes are likely to suffer from concentration polarization and thus have problems of low water flux and fouling, causing increase in water production costs.

Recently, research on a membrane manufactured using aquaporin, graphene, carbon nanotubes, and the like, is being conducted.

Particularly, graphene has excellent properties. Thus, a graphene-based membrane has attracted wide attention due to high water flux and salt rejection thereof.

Pure graphene consisting of $sp_2$ bonds is impermeable to water. Thus, in order to use graphene as a water treatment membrane, nanoscale pores must be formed in graphene.

For this purpose, fabrication of defect-free large-area graphene is required. However, this has technological limitations at present. In addition, it is difficult to form nanoscale pores in large-area graphene in a controlled manner. Further, there are problems of high process costs, low process efficiency, and the like.

A graphene-based membrane according to the present invention may include: monolayer graphene containing defects; a deposition layer disposed on the defects; and nanopores surrounded by the deposition layer.

Now, the graphene-based membrane according to the present invention will be described with reference to FIGS. 1 and 2.

Figure 1:
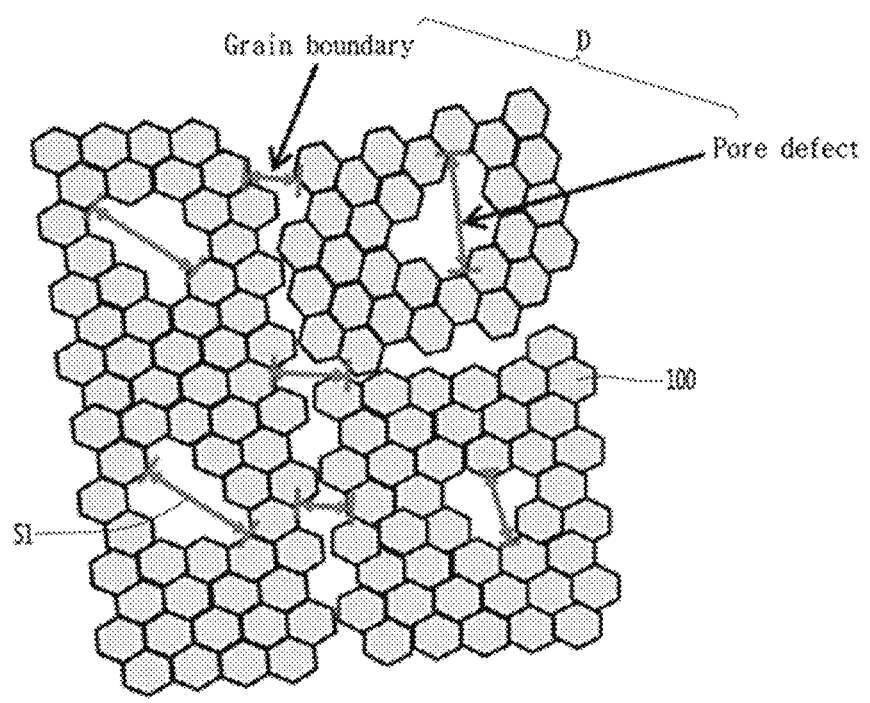
FIG. 1 is a plan view of monolayer graphene containing defects.

FIG. 1 is a plan view of graphene 100. The graphene 100 may be processed to be porous, thereby fabricating a graphene-based membrane.

Referring to FIG. 1, the graphene 100 may contain defects D. Here, the term "defects" may refer to at least one of point defects, line defects, and planar defects. Specifically, the defects D may include point defects such as a vacancy and an interstitial atom, line defects such as dislocations, and planar defects such as a grain boundary.

The graphene 100 may include the defects D formed in a regular or irregular pattern.

The graphene 100 may include a plurality of defects D. Distance between adjacent defects may be the same or different. Size of the plurality of defects D may be the same or different.

Generally, research on graphene is focused on fabricating defect-free graphene. For graphene having defects, much research is aimed at healing the defects.

In contrast, the graphene-based membrane according to the present invention is manufactured using graphene containing defects, thereby reducing processing or synthesis costs.

The graphene may be formed in a single layer. For example, the graphene monolayer may have a thickness of 0.34 nm. In other words, the graphene-based membrane may be thin. For example, the graphene-based membrane may be about 1,000 times as thin as a typical polymeric reverse osmosis membrane. Thus, the graphene-based membrane according to the present invention can increase a water treatment rate, thereby improving process efficiency.

Figure 2:
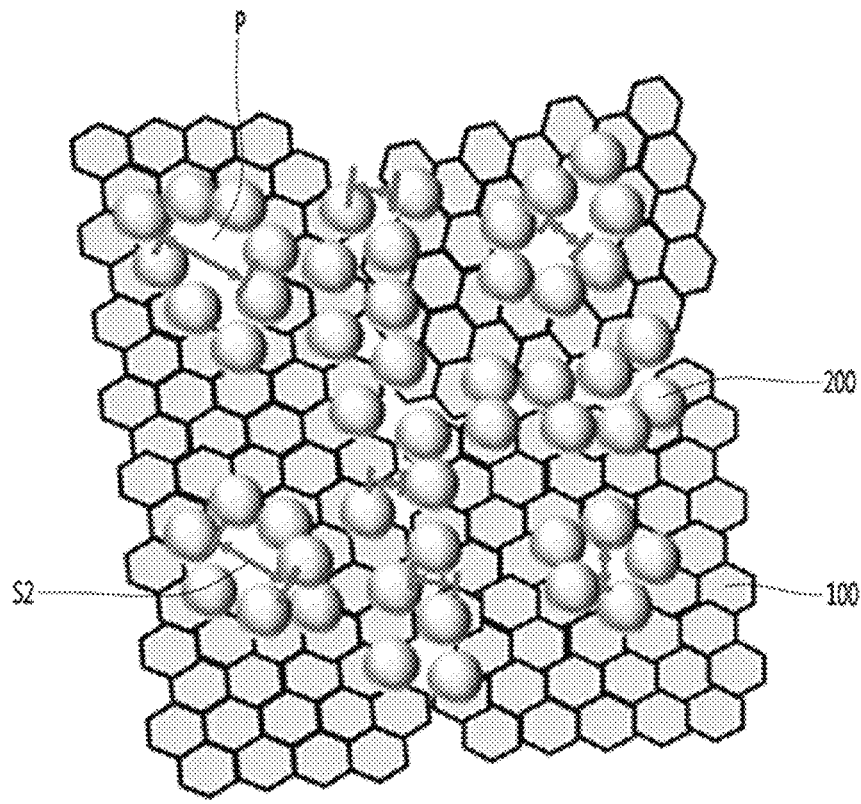
FIG. 2 is a plan view of a graphene-based membrane according to the present invention.

FIG. 2 is a plan view of graphene processed to provide the graphene-based membrane according to the present invention.

The deposition layer 200 may be disposed on the defects D of the graphene 100.

The deposition layer 200 may be partially disposed on the graphene 100. Thus, the deposition layer 200 has a smaller plan area than the graphene 100.

The deposition layer 200 may be formed in a single layer. Thus, the pore size of the graphene-based membrane according to the present invention may be selectively controlled while reducing the thickness of the membrane.

The thickness of the graphene-based membrane according to the present invention may vary depending on locations. The graphene-based membrane according to the present invention may have a first thickness and a second thickness. For example, a section of the graphene-based membrane only composed of the graphene 100 may have a first thickness, and a section of the graphene-based membrane having the deposition layer 200 disposed on the defects of the graphene 100 may have a second thickness. The first thickness may be smaller than the second thickness.

The deposition layer 200 may be partially disposed on a section of the graphene 100 having the defects D. More specifically, the deposition layer 200 may be selectively disposed on the boundaries of the defects. Thus, the boundaries of the defects may be overlapped by the deposition layer 200. Here, the term "boundary of the defects" may refer to a region where carbon atoms are not connected to one another through $sp_2$ bonds due to the defects, a region where the density of carbon atoms is changed, or a region where the distribution of carbon atoms is changed irregularly.

For example, the deposition layer 200 may be disposed on at least one of one surface of the graphene 100 having the defects D and the other surface of the graphene 100. For example, the deposition layer 200 may be placed inside the defects D to be contained in the same layer as the graphene 100. For example, the deposition layer 200 may be disposed on a surface of the graphene 100 at boundaries of the defects D, the other surface of the graphene 100, and at sides of an open region inside the boundaries.

The deposition layer may include at least one of a metal oxide and a metal. In other words, at least one of a metal oxide and a metal may be deposited on the defects of the graphene. Since at least one of a metal oxide and a metal is deposited on the defects of the graphene, it is possible to control the pore size of the graphene.

The deposition layer 200 may include a material more hydrophilic than the graphene 100. For example, a surface of the metal oxide deposited on the defects of the graphene may have polarity. In other words, due to hydrophilicity thereof, the metal oxide can improve water flux and reduce fouling of the membrane. In addition, the metal oxide can improve salt rejection. More specifically, the graphene-based membrane according to the present invention may have a salt rejection of 95% or higher. For example, the graphene-based membrane according to the present invention may have a salt rejection of about 99% or higher.

In addition, the graphene-based membrane according to the present invention may have a water flux several hundred times that of a typical polymeric membrane. For example, the graphene-based membrane according to the present invention may have a water flux 100 times to 500 times that of a typical polymeric membrane.

The graphene-based membrane may contain pores P. The pores P may be a region surrounded by the deposition layer 200. More particularly, the pores P may be a region surrounded by the deposition layer 200 and may be opened up between carbon atoms of the graphene.

Since the graphene-based membrane contains the pores P, the graphene-based membrane can effectively filter out salt from saltwater. Thus, desalination of saltwater can be highly efficiently achieved at low cost.

The pores P may have various sizes. Size of the pores may vary depending a material to be removed. Examples of the material to be removed may include salt, germs, viruses, colloids, and the like.

In other words, the graphene-based membrane according to the present invention may include pores having a suitable size for at least one of a reverse osmosis membrane, a forward osmosis membrane, a microfiltration membrane, an ultrafiltration membrane, and a nanofiltration membrane. The pores may have a size of 0.1 nm to 10 μm.

The pores P may be nanoscale pores. Here, the nanoscale pores must be selectively impermeable to specific impurities. For example, the pores may have a size of 0.1 nm to 1 μm. For example, the pores may have a size of 0.2 nm to 1 μm. The pores may have a smaller size than the defects D. For example, the size (S1) of a first defect shown in FIG. 1 may be larger than the size (S2) of a first pore shown in FIG. 2. In other words, comparing the size of a pore and the size of a defect at a corresponding position, the pore P may have a smaller size than the defect D due to the deposition layer disposed on the defect.

In addition, the pores contained in the graphene-based membrane may have a smaller average size than the defects contained in the graphene. Thus, even when the defects of the graphene have larger size than salt and are permeable to salt, the pores can have a smaller size than salt.

By way of example, a graphene-based porous reverse osmosis membrane will be described in detail.

Salt has a larger size than a water molecule. Thus, graphene used for a reverse osmosis membrane must have pores sized to be permeable to water and impermeable to salt.

The graphene-based reverse osmosis membrane may be nanoporous. For example, the graphene-based reverse osmosis membrane may have a pore size of 1 nm or less. Specifically, the graphene-based reverse osmosis membrane may have a pore size of 0.1 nm to 0.5 nm. More specifically, the graphene-based reverse osmosis membrane may have a pore size of 0.2 nm to 0.5 nm.

However, it should be understood that the present invention is not limited thereto and the pore size may be adjusted to remove materials having various sizes, such as germs, viruses, and colloids. Thus, the porous graphene according to the present invention may be used for a forward osmosis membrane, a nanofiltration membrane, a microfiltration membrane, and an ultrafiltration membrane, in addition to a reverse osmosis membrane.

In addition, the graphene is flexible and has excellent physical properties. For example, the graphene may have a tensile strength of 130 GPa, a Young's modulus of 1 TPa, and a density of 2.2 g/cm$^3$. Further, the graphene may have excellent chemical properties. For example, the graphene has a regular, rigid structure and can be thermally stable at a high temperature up to about 2,800° C. under an Ar atmosphere.

Thus, the graphene-based porous membrane according to the present invention including physically and chemically stable graphene can be used permanently or semi-permanently and is highly economical.

In addition, the graphene-based porous membrane according to the present invention includes a monolayer large-area graphene, making it possible to increase the number of pores and to reduce thickness of the membrane. Thus, the graphene-based porous membrane can desalinate a much larger amount of saltwater while reducing energy consumption.

Further, the graphene-based porous membrane according to the present invention is manufactured using graphene having defects and can adjust pore size through adjustment of the size of defects without employing a separate pore-forming technique. Thus, it is possible to fabricate various water treatment membranes.

Moreover, according to the present invention, a metal oxide or a metal is deposited on defects of graphene, whereby nanoscale pores can be formed through control and utilization of the defects. Such nanoscale pores may be sized to be impermeable to salt and permeable to water. Thus, it is possible to effectively remove salt from saltwater.

Next, a method of manufacturing a graphene-based membrane according to one embodiment of the present invention will be described.

Figure 3:
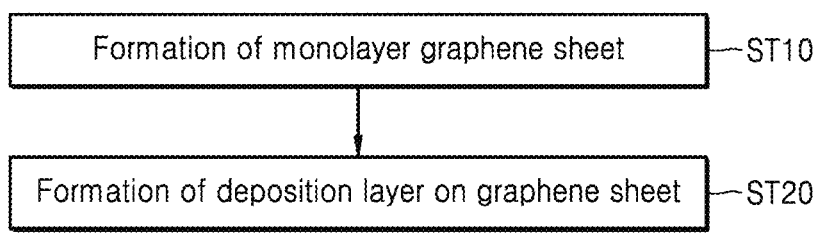
FIG. 3 is a flowchart of a method of manufacturing a graphene-based membrane according to the present invention.

Referring to FIG. 3, a method of manufacturing a graphene-based membrane according to one embodiment of the present invention may include: forming a monolayer graphene sheet (Step 10); and forming a deposition layer on the graphene sheet (Step 20).

First, Step 10 will be described. The monolayer graphene sheet may be formed on a support layer. For example, the monolayer graphene sheet may be formed on a polycarbonate track etched (PCTE) support layer.

A monolayer large-area graphene sheet may be manufactured by chemical vapor deposition (CVD). For example, a highly carbon absorbable transition metal such as nickel (Ni), copper (Cu), or platinum (Pt) is provided as a catalytic layer, followed by introduction of a mixed gas of $CH_4$, $H_2$, and Ar at a high temperature of 1,000° C. or higher. After carbon of the mixed gas introduced at high temperature reacts with the catalytic layer, the resulting product is subjected to quenching. As a result, carbon is separated from the catalyst, such that graphene can be grown on a surface of the catalytic layer.

Here, the monolayer graphene may include various defects. For example, the density or distribution of the defects and grain boundaries may vary depending on conditions of a gas atmosphere, the kind of a metal specimen, and the grain of a metal specimen.

Next, Step 2 will be described.

The deposition layer may be partially formed on the graphene sheet.

The graphene sheet formed in Step 1 contains defects and the deposition layer formed in Step 2 may be deposited on the boundaries of the defects.

In other words, at least one of a metal oxide or a metal is deposited on the graphene containing the defects, whereby the size of the defects may be adjusted. As a result, it is possible to fabricate a nanoporous graphene-based membrane.

The deposition layer may be formed by atomic layer deposition. Thus, at least one of a metal oxide or a metal may be deposited on the defects and the grain boundaries. Specifically, at least one of a metal oxide or a metal may be selectively deposited on the defects of the graphene by atomic layer deposition.

For example, the defects may be surrounded by the metal oxide deposited on the defects, such that pore size can be reduced.

In other words, the pore size can be controlled by adjusting the size of the defects and/or by depositing at least one of a metal oxide and a metal in a controlled manner Thus, the graphene-based membrane according to the present invention may be used in fabricating at least one of a reverse osmosis membrane, a forward osmosis membrane, a microfiltration membrane, an ultrafiltration membrane, and a nanofiltration membrane.

In addition, the graphene-based membrane according to the present invention may be manufactured using defect-containing graphene. Specifically, according to the present invention, it is possible to overcome technical difficulty in fabrication of a defect-free monolayer large-area graphene and technical difficulty in formation of nanoscale pores in such a defect-free monolayer large-area graphene. Thus, it is possible to reduce process costs and to improve process efficiency.

Further, according to the present invention, it is possible to provide a graphene-based porous membrane having high water flux and salt rejection.

Although the present invention has been described with reference to some embodiments, it should be understood that the foregoing embodiments are provided for illustration only and are not to be construed in any way as limiting the present invention, and that various modifications, changes, alterations, and equivalent embodiments can be made by those skilled in the art without departing from the spirit and scope of the invention. For example, each component described in the embodiments of the present invention can be modified in various forms. In addition, differences relating to these modifications and applications are to be construed as within the scope of the invention defined in the appended claims. Therefore, the scope of the invention should be limited only by the accompanying claims and equivalents thereof.

What is claimed is:

1. A graphene-based membrane, comprising:
   a monolayer graphene having defects; and
   a deposition layer selectively deposited on boundaries of the defects, whereby forming pores surrounded by the deposition layer;
   wherein the deposition layer comprises a material more hydrophilic than the monolayer graphene.

2. The graphene-based membrane according to claim 1, wherein the deposition layer comprises at least one of a metal oxide and a metal.

3. The graphene-based membrane according to claim 1, wherein the deposition layer is composed of a single layer.

4. The graphene-based membrane according to claim 1, wherein the pores has a size of 0.1 nm to 1 μm.

5. A method of manufacturing a graphene-based membrane, comprising:
   forming a monolayer graphene sheet having defects; and
   forming a deposition layer on boundaries of the defects, whereby forming pores surrounded by the deposition layer;
   wherein the deposition layer comprises a material more hydrophilic than the monolayer graphene.

6. The method according to claim 5, wherein the graphene sheet is formed by chemical vapor deposition.

7. The method according to claim 5, wherein the deposition layer is formed by atomic layer deposition.

* * * * *